US009766483B2

(12) United States Patent
Banno et al.

(10) Patent No.: US 9,766,483 B2
(45) Date of Patent: Sep. 19, 2017

(54) OPTICAL TRANSCEIVER IMPLEMENTING ERBIUM DOPED FIBER AMPLIFIER

(71) Applicant: SUMITOMO ELECTRIC INDUSTRIES, LTD., Osaka (JP)

(72) Inventors: Eiichi Banno, Yokohama (JP); Takatoshi Kato, Yokohama (JP); Eiji Tsumura, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/410,034

(22) Filed: Jan. 19, 2017

(65) Prior Publication Data

US 2017/0212366 A1   Jul. 27, 2017

Related U.S. Application Data

(60) Provisional application No. 62/281,517, filed on Jan. 21, 2016, provisional application No. 62/310,282, filed on Mar. 18, 2016.

(51) Int. Cl.
| | |
|---|---|
| H01S 3/067 | (2006.01) |
| H04B 10/40 | (2013.01) |
| G02F 1/01 | (2006.01) |
| G02B 26/00 | (2006.01) |
| G02F 1/225 | (2006.01) |
| H01S 3/16 | (2006.01) |
| H01S 3/13 | (2006.01) |

(Continued)

(52) U.S. Cl.
CPC ......... *G02F 1/0123* (2013.01); *G02B 26/001* (2013.01); *G02F 1/2257* (2013.01); *H01S 3/0078* (2013.01); *H01S 3/06754* (2013.01); *H01S 3/1301* (2013.01); *H01S 3/1608* (2013.01); *H04B 10/40* (2013.01); *G02F 2001/212* (2013.01); *G02F 2201/58* (2013.01)

(58) Field of Classification Search
CPC ... H01S 3/0078; H01S 3/1301; H01S 3/06754
See application file for complete search history.

(56) References Cited

U.S. PATENT DOCUMENTS

| | | | | |
|---|---|---|---|---|
| 5,986,800 A | * | 11/1999 | Kosaka | H01S 3/06754 |
| | | | | 359/341.41 |
| 6,016,213 A | * | 1/2000 | Farber | H04B 10/07 |
| | | | | 359/337 |

(Continued)

FOREIGN PATENT DOCUMENTS

| | | |
|---|---|---|
| JP | 2002-359421 | 12/2002 |
| WO | 00/04613 | 1/2002 |

*Primary Examiner* — Eric Bolda
(74) *Attorney, Agent, or Firm* — Smith, Gambrell & Russell, LLP

(57) ABSTRACT

An optical transceiver that includes an optical modulator of a Mach-Zehnder type and made of primarily semiconductor materials, and an Erbium Doped Fiber Amplifier (fiber amplifier) is disclosed. The fiber amplifier and the MZ modulator, in addition to a wavelength tunable laser diode, an intelligent coherent receiver, and a polarization maintaining splitter, are installed within a compact case following the standard of CFP2. The fiber amplifier provides a wavelength tunable filter that passes light amplified by the fiber amplifier but eliminates amplified spontaneous emission in regions out of the wavelength band of the light.

13 Claims, 7 Drawing Sheets

(51) Int. Cl.
*H01S 3/00* (2006.01)
*G02F 1/21* (2006.01)

(56) References Cited

U.S. PATENT DOCUMENTS

| | | | | |
|---|---|---|---|---|
| 6,043,922 | A * | 3/2000 | Koga | H04B 10/675 |
| | | | | 359/199.1 |
| 6,359,724 | B1 | 3/2002 | Katagiri et al. | |
| 6,728,026 | B2 * | 4/2004 | Lee | H01S 3/06758 |
| | | | | 359/337.11 |
| 2004/0062557 | A1 * | 4/2004 | Takashima | H04B 10/674 |
| | | | | 398/209 |
| 2005/0201754 | A1 * | 9/2005 | Fujita | H04J 14/0279 |
| | | | | 398/85 |
| 2005/0206997 | A1 * | 9/2005 | Hubbard | G02F 1/39 |
| | | | | 359/330 |
| 2007/0206273 | A1 * | 9/2007 | Ghera | H04J 14/0221 |
| | | | | 359/337 |
| 2016/0094017 | A1 * | 3/2016 | Larson | H01S 5/50 |
| | | | | 359/344 |

\* cited by examiner

# OPTICAL TRANSCEIVER IMPLEMENTING ERBIUM DOPED FIBER AMPLIFIER

CROSS-REFERENCE TO RELATED APPLICATIONS

This application claims the priority under 35 U.S.C. §119 of U.S. Provisional Application Ser. No. 62/281,517, filed on Jan. 21, 2016, and U.S. Provisional Application Ser. No. 62/310,282, filed on Mar. 18, 2016; the contents of which are relied upon and incorporated herein by reference in its/their entirety.

TECHNICAL FIELD

The present application relates to an optical transceiver, in particular, the application relates to an optical transceiver that implements a fiber amplifier and is primarily used in the coherent wavelength division multiplexing (WDM) system.

BACKGROUND

Abrupt increase of information to be transmitted on an optical communication system has requested an optical transceiver operable in further faster speed exceeding 10 Gbps and sometimes reaching 100 Gbps. In addition to the increase of the operation speed, some optical transceivers implement a function of the coherent modulation where an optical signal is modulated in phase of light. Such a transceiver or the optical communication system to modulate the phase of the light are called as the coherent optical transceiver and the coherent optical system.

In a coherent optical transceiver, an optical modulator types of, what is called, the Mach-Zehnder (MZ) modulator, is inevitable to modulate a phase of light. The MZ modulator is conventionally made of dielectric material, typically a lithium niobate (LiNbO$_3$), because of a large coupling efficiency between electrical properties and optical properties thereof. However, the MZ modulator made of the dielectric material has large dimensions to show an enough interaction, which makes hard to be installed within an optical transceiver with a limited outer dimensions.

Another type of the MZ modulator primarily made of semiconductor material has been developed. Because of larger refractive index of semiconductor materials compared with those of dielectric materials, the MZ modulator made of semiconductor materials has smaller dimensions so as to be installed within a small sized optical transceiver. However, as a compensation of the smaller dimensions, the MZ modulator of semiconductor materials inevitably or inherently shows a greater optical loss. Accordingly, a means to amplify an optical signal output from the MZ modulator, or entering the MZ modulator, that is, an optical amplifier type of erbium doped fiber amplifier (fiber amplifier), is necessary to be installed within the optical transceiver.

SUMMARY

One aspect of the present application relates to a method of controlling an optical transceiver that implements a wavelength tunable optical source and a fiber amplifier. The fiber amplifier provides an erbium doped fiber (EDF), an amplified spontaneous emission (ASE) filter, a variable optical attenuator (VOA), a first monitor photodiode (mPD), and a second mPD. The first mPD senses an output of the VOA, while, the second mPD senses an output of the ASE filter. The ASE filter has a tunable wavelength passing band but filters out amplified spontaneous emissions out of the tunable wavelength passing band. The method of the present application comprises steps of: (a) tuning the tunable wavelength passing band of the ASE filter to a preset wavelength of the wavelength tunable optical source by sensing the output of the ASE filter with the second mPD; (b) adjusting output power of the fiber amplifier to a preset power by sensing the output of the VOA with the first mPD; and (3) iterating the steps of tuning the tunable wavelength passing band of the ASE filter and adjusting the output power of the fiber amplifier so that the fiber amplifier emits light with the preset power at the preset wavelength.

The second aspect of the present application relates to an optical transceiver that communicates with a host system. The optical transceiver of the preset application includes a wavelength tunable optical source and a fiber amplifier, where the wavelength tunable optical source emits light with a preset wavelength that is set by a command provided from the host system. The fiber amplifier includes an EDF, a pumping source, an ASE filter and a VOA. The pumping source provides a pump beam to the EDF by which the EDF amplifies the light provided from the wavelength tunable optical source. The ASE filter, which is implemented downstream of the EDF, has a tunable wavelength passing band that passes the light amplified by the EDF but filters out amplified spontaneous emissions generated by the EDF and having wavelengths out of the tunable wavelength passing band. The VOA, which is implemented downstream of the ASE filter, sets the output power of the fiber amplifier to a preset power by attenuating the amplified light received from the EDF and passing the ASE filter.

The third aspect of the present application also relates to an optical transceiver that communicates with a host system. The optical transceiver includes a wavelength tunable optical source and a fiber amplifier. The wavelength tunable optical source emits light with a preset wavelength set by a command provided from the host system. The fiber amplifier includes an EDF, a pumping source, an ASE filter, an mPD, and a controller. The pumping source provides a pump beam to the EDF by which the EDF amplifies the light provided from the wavelength tunable optical source. The ASE filter, which is implemented downstream of the EDF, has a tunable wavelength passing band for passing the light amplified by the EDF but filters out amplified spontaneous emissions having wavelengths out of the tunable wavelength passing band. The optical transceiver of the present aspect has a feature that the mPD, the pumping source, and the controller form a feedback loop that adjusts the output of the fiber amplifier to preset power, and the mPD, the ASE filter, and the controller form another feedback loop that tunes the tunable wavelength passing band of the ASE filter to the preset wavelength of the wavelength tunable optical source.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Next, some examples of an optical transceiver according to the present application will be described in detail as referring to accompanied drawings. In the description of the drawings, numerals or symbols same with or similar to each other will refer to elements same with or similar to each other without duplicating explanations.

Figure 1:
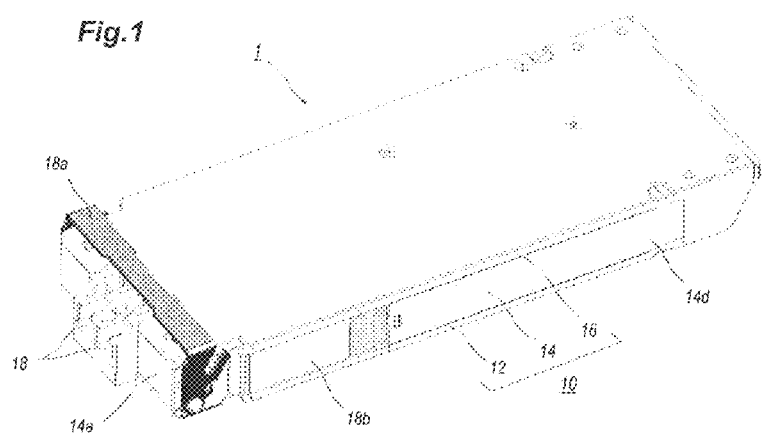
FIG. 1 shows an outer appearance of an optical transceiver according to an embodiment of the present invention.

FIG. 1 shows an outer appearance of an optical transceiver of the present application, where the optical transceiver 1 of the present application follows the standard of the centum form factor pluggable 2 (CFP2), which is one of multi-source agreements (MSA) defining electrical/optical specifications and physical dimensions of an optical transceiver widely used in the field of the optical communication system. The optical transceiver 1 has a housing 10 whose dimensions follow the CFP2 standard; that is, the housing 10 has dimensions of 91.5 mm in length, 41.5 mm in width, and 12.4 mm in height, respectively. As shown in FIG. 1, the housing 10 of the present embodiment comprises a top housing 12 or a top cover, a frame 14, and a bottom housing 16 or a bottom cover. The top housing 12 and the bottom housing 16 sandwich the frame 14, which forms an inner space for enclosing optical and electrical components therein. The front wall 14a of the frame 14 provides an optical receptacle 18 of a type of LC (Lucent Connector) receptacle. The optical receptacle 18 provides two optical ports, one of which is for the optical transmission and the other is for the optical reception. Accordingly, the optical transceiver 1 may be operable in the full-duplex optical communication. Moreover, as described below, the optical transceiver 1 may be operable for the modulation system using the DP-QPSK (Dual Polarization Quadrature Phase Shift Keying) algorithm, where an optical signal entering the optical transceiver 1 has four degrees of the multiplicity, namely, two multiplicities in the phase of the optical signal and two multiplicities in the polarization.

Respective sides of the front wall 14a provide a mechanism including a bail 18a and the slider 18b that is slidable rearward and forward working with the rotation of the bail 18a. Thus, the optical transceiver 1 may be plugged with or released from the host system. Although not explicitly illustrated in FIG. 1, the optical transceiver 1 provides an electrical plug in a rear end thereof. The electrical plug is to be mated with an electrical connector provided in the host system, which establishes the electrical communication with respect to the host system. In the present specification, the term "front" and/or "forward" is assumed to be a direction where the optical receptacle 18 is provided. On the other hand, the term "rear" and/or "back" corresponds to an opposite direction where the electrical plug is provided. But those notations could not affect the scope of the present invention.

Figure 2A:
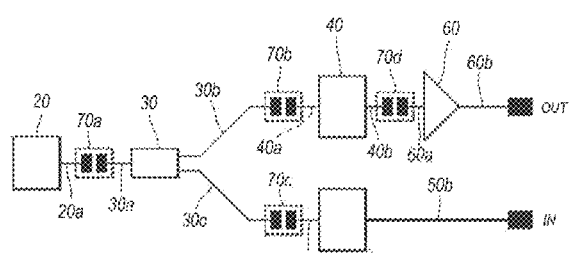
FIG. 2A shows a block diagram of optical components implemented in the optical transceiver shown in FIG. 1.

FIG. 2A schematically illustrates an optical coupling system in the optical transceiver 1 shown in FIG. 1. The optical transceiver 1 installs, in the inner space, a wavelength tunable optical source 20, an optical modulator 40, an optical receiver 50, and a fiber amplifier 60. The wavelength tunable optical source 20 may be a wavelength tunable laser diode (t-LD) that emits continuous wave (CW) light as a local beam, where the CW light whose wavelength is tunable depending on biases supplied thereto. The local beam is split by a polarization maintaining splitter (PMS) 30 into two beams, one of which is provided to the optical modulator 40 as the CW beam to be modulated; while, the other is provided to the optical receiver 50 as a local beam to be interfered with an optical signal entering the optical transceiver 1. The PMS 30 is optically coupled with the t-LD 20 by a polarization maintaining fibers (PMF), 20a and 30a, as interposing the first polarization maintaining connector (PMC) 70a. The PMS 30 is coupled with the optical modulator 40 by the PMFs, 30b and 40a, as interposing the second PMC 70b; also coupled with the optical receiver 50 by the PMFs, 30c and 50a, as interposing the third PMC 70c. Thus, the polarization of the light output from the t-LD 20 may be maintained to the optical modulator 40 and the optical receiver 50.

The optical receiver 50 is coupled with the PMS 30 through the PMFs, 30c and 50a, as interposing the third PMC 70c. The optical receiver 50 receives the incoming optical signal, which contains a plurality of extractable optical signals depending on the phases and the polarizations thereof, through a single mode fiber (SMF) 50b from the input port IN of the optical transceiver 1.

The optical modulator 40 is disposed between two PMCs, 70b and 70d. The former PMC 70b couples with the optical modulator 40 through the PMF 40a, while, the latter PMC 70d couples with the optical modulator 40 by an SMF 40b. In FIG. 2A, bold lines denote the SMFs, while, slim lines denote the PMFs. Because the output of the optical modulator 40 is extracted through the SMF 60b, the connector 70d is unnecessary to be a type of a PMC. However, the optical transceiver 1 of the embodiment uses the PMC 70d to couple SMFs, 40b and 60a, because of the simplicity. The output of the optical modulator 40, as described above, is provided to the fiber amplifier 60 through the SMF 60a.

Figure 2B:
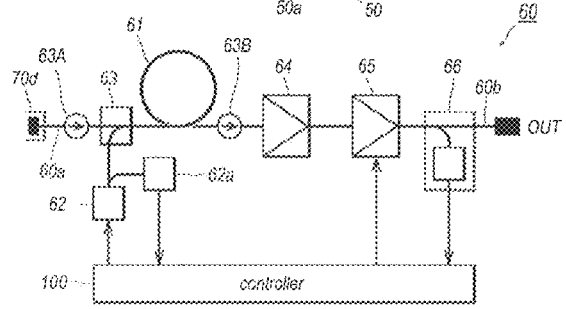
FIG. 2B shows a block diagram of a fiber amplifier in the optical transceiver.

FIG. 2B schematically shows a functional block diagram of a fiber amplifier 60 in the optical transceiver 1. The fiber amplifier 60 receives an optical signal from the optical modulator 40 through the SMFs, 40b and 60a, and an optical isolator 63A that prevents light from returning to the optical modulator 40. The optical signal output from the optical modulator 40 is merged with a pump beam, which is generated by a pumping source 62 of a type of an LD through the wavelength selective coupler (WSC) 63. The optical signal merged with the pump beam enters the erbium doped fiber (EDF) 61 to be optically amplified thereby. The amplified optical signal is provided to the gain flattening filter (GFF) 64. The fiber amplifier 60 may further provide another optical isolator 63B downstream of the EDF 61 that prevents an amplified optical beam from returning to the EDF 61 as stray light, which becomes optical noises for the EDF 61. Because the EDF 61 has an optical gain largely depending on wavelengths of the optical signal; the GFF 64 equalizes the gain spectrum of the EDF 61. The amplified and equalized optical signal is provided to a variable optical attenuator (VOA) 65. The VOA 65 attenuates the amplified optical signal to an adequate power level by adjustable attenuation. The monitor photodiode (mPD) 66 with an optical tap is put downstream of the VOA 65. The mPD 66 senses the power of the optical beam output from the VOA 65 and keeps the power thereof in a target level defined by the specification of the MSA by controlling the VOA 65. The optical signal thus amplified, equalized, and variably attenuated to the target level is output from the output port OUT through the SMF 60b. In the optical transceiver 1 with the fiber amplifier 60 in the output thereof, the amplified output power of the optical signal may be maintained by a feedback loop of the mPD 66, a controller 100, and the VOA 65 or the pumping source 62, which is often called automatic power control (APC). Also, the pumping source 62 accompanies with another mPD 62a that senses the optical power output from the pumping source 62. That is, another APC loop that includes the mPD 62a, the controller 100, and the pumping source 62 may maintain the optical power of the pumping source 62 at a preset power.

One typical application of the optical transceiver 1 shown in FIGS. 1, 2A, and 2B is the coherent optical system, where an optical transceiver receiving an optical signal and outputting another optical signal having a wavelength same with that of the received optical signal. The received optical signal and the transmitted optical signal may have one specific wavelength but multiplexing two or more phases, two or more signal amplitudes, and two polarizations. However, the former two techniques, namely, the multiplicity by the phase and the multiplicity by the amplitude, are currently restricted to the dual multiplicity because of the operating speed of the electrical circuits. Even recent advanced electrical circuits could not follow the speed of light, or the frequency of light. Accordingly, other alternatives that enhance the multiplicity of the transmitted signal have been proposed. That is, optical transceivers each generating an optical signal whose wavelength is specific thereto and different from each other are passively coupled in the optical outputs therefrom by, for instance, optical couplers. The optical signals, which are passively coupled, may be transmitted on a single fiber as the wavelength multiplexed signal. An optical transceiver implemented in such a system receives the WDM signal; and, without de-multiplexing the WDM signal, extracts and recovers data contained in one of the optical signals whose wavelength matches with the wavelength of the transmitted signal that the optical transceiver just transmits. Because an optical transceiver applicable to the coherent system implements an optical phase comparator, which is often called as an optical hybrid, and recovers data contained in an optical signal whose wavelength matches with the wavelength which the t-LD 20 in the optical transceiver 1 just outputs.

Figure 3:
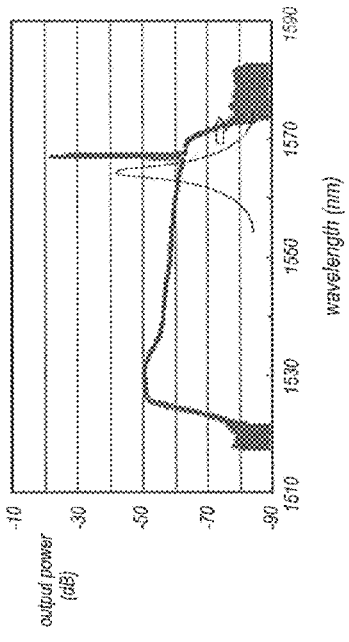
FIG. 3 shows optical spectra of optical signals output from the fiber amplifier.

Such an optical transceiver implementing an fiber amplifier and applied in the coherent WDM system is necessary to reduce optical noises not only the transmitted wavelength but whole wavelengths defined in the WDM system. FIG. 3 explains a reason why the noise reduction becomes a key factor in the coherent WDM system.

As described above, the fiber amplifier 60 implemented in the output stage of the optical transceiver keeps the optical output thereof at the target power by the APC loop of the mPD 66, the controller 100, and the pumping source 62 or the VOA 65. However, the optical amplification by an EDF inevitably accompanies, what is called, the amplified spontaneous emission (ASE). FIG. 3 shows various output spectra of the fiber amplifier 60 in the optical transceiver 1. In FIG. 3, floor noises or terrace noises around −60 dB in a wavelength range from 1520 nm to 1575 nm are called ASE. Moreover, the magnitude of the ASE depends on the wavelength. Specifically, the EDF 61 has the wavelength dependent optical gain; that is, the gain of the EDF 61 reduces in relatively longer wavelengths. Accordingly, even when the fiber amplifier 60 receives an optical signal with preset amplitude, the EDF 61 is necessary to be provided with the pumping power dependent on the wavelength of the input optical signal. In particular, when the input optical signal has a relatively longer wavelength, the pumping power becomes greater in order to maintain the optical output power in the preset level, which means that the ASE increases in particular, the ASE in shorter wavelengths becomes larger compared with those in longer wavelengths because of the gain characteristic of the EDF 61.

When the optical signal output from one optical transceiver like the present embodiment is wavelength multiplexed with those output from other optical transceivers to realize the coherent WDM system, the respective ASEs are inevitably superposed to each other. Specifically, when the system implements four optical transceivers each generating output signals with wavelengths like those shown in FIG. 3 and implementing respective fiber amplifiers like the present embodiment accompanying with the ASEs of around −60 dB, total ASEs after passively superposing these four optical signals increases to −54 dB even the ASEs show wavelength independent magnitude. When the ASE becomes larger in shorter wavelengths as shown in FIG. 3, the total magnitude of the ASE further degrades.

Figure 4:
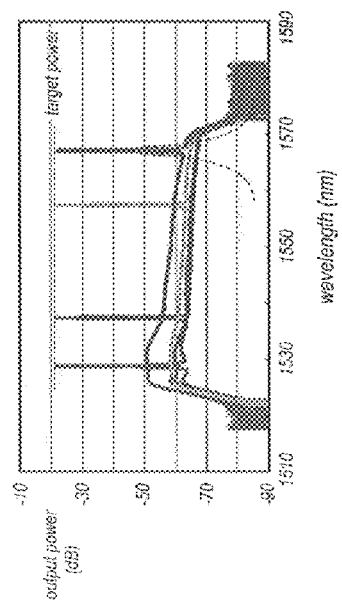
FIG. 4 shows an optical spectrum of the optical signal output from the fiber amplifier and a method of aligning the center of the wavelength passing band of the ASE filter implemented in the fiber amplifier with the peak wavelength of the optical signal.

The optical transceiver that receives such passively superposed optical signals is necessary to extract one optical signal from the degraded input optical signal, which not only reduces the accuracy of the recovery but also sometimes makes unable to recover. Thus, the optical transceiver like the present embodiment that implements the fiber amplifier in the output stage thereof is inevitable to reduce the ASE. However, the wavelength of the output optical signal of the optical transceiver 1 is optional, namely, depending on the wavelength of the input optical signal, a configuration where the EDF 61 accompanies with a simply band-passing filter (BPF) downstream thereof could not solve the subject described above. A BPF, whose wavelength passing band is necessary to be variable as indicated by a broken line in FIG. 3, namely, an optionally selectable wavelength passing band becomes necessary. The peak wavelength of the BPF is necessary to be varied or scanned to align with the wavelength of the output optical signal, which is shown in FIG. 4.

First Embodiment

Figure 5:
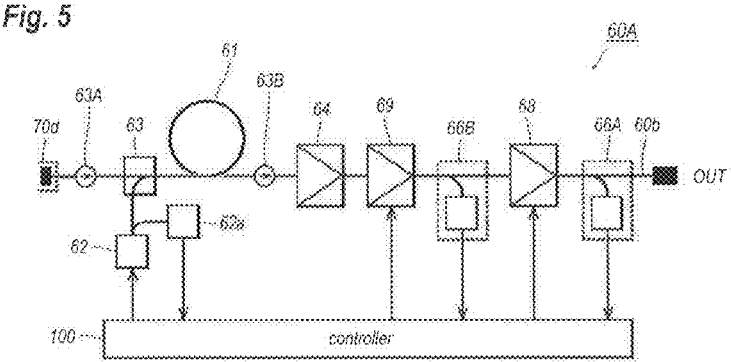
FIG. 5 shows a block diagram of a fiber amplifier according to the first embodiment of the present application.

FIG. 5 schematically illustrates a functional block diagram of a fiber amplifier 60A implemented within an optical transceiver that is applicable to the coherent WDM system. The fiber amplifier 60A shown in FIG. 5 provides a wavelength tunable filter, which will be denoted as ASE filter 69, downstream of the GFF 64 and a second mPD 66B for sensing the output of the ASE Filter 69. The second mPD 66B, the controller 100, and the ASE Filter 69 constitute a feedback loop that aligns the wavelength passing band of the ASE Filter 69 with the peak wavelength of the optical signal. That is, scanning the wavelength passing band of the ASE Filter 69 as sensing the output power of the ASE Filter 69 by the second mPD 66B, the wavelength passing band of the ASE Filter 69 may be determined at a wavelength where the output of the second mPD 66B becomes a maximum. The other feedback loop of the first mPD 66A, the controller 100, and the VOA 68 maintains the output power of the optical signal output from the fiber amplifier 60A in the target power. Also, the third feedback loop of the PD 62a, the controller 100, and the pumping source 62 maintain the pumping power for the EDF 61. However, the third APC loop may be removed because the output power of the pumping source 62 may be controlled based on the output of the first and the second mPDs, 66A and 66B. In the fiber amplifier 60A shown in FIG. 5, because the ASE filter 69 is set downstream of the EDF 61, the noises due to the amplified stimulated emission whose wavelengths are set outside of the passing band of the ASE filter 69 may be effectively eliminated.

Various types of the ASE filter 69, namely, the wavelength tunable filter, attributed to a narrow passing band, have been known in the field. For instance, a Mach-Zander interferometer, which has two arm waveguides with respective lengths different from each other, may show the function of the tunable filter. Adjusting a bias supplied to one of the arm waveguides may tune the passing band thereof. Because the lengths of the arm waveguides are different, optical signals with wavelengths outside of the passing band disappear at the output of the MZ interferometer. A diffraction grating is also known as the type of wavelength tunable filter having a narrow passing band. Adjusting an incident angle of the optical signal to the diffraction grating, the passing band thereof varies. A physical mask or the like adequately set downstream of the diffraction grating may effectively eliminate optical signals caused by the second or higher order diffraction. An etalon filter is known as still another type of a wavelength tunable filter. An etalon filter inherently shows a periodic transmission spectrum whose maximum transmittance may be varied depending on a temperature thereof. Accordingly, adjusting the temperature, the maximum transmittance may be aligned with the emission wavelength of the t-LD 20.

Figure 6:
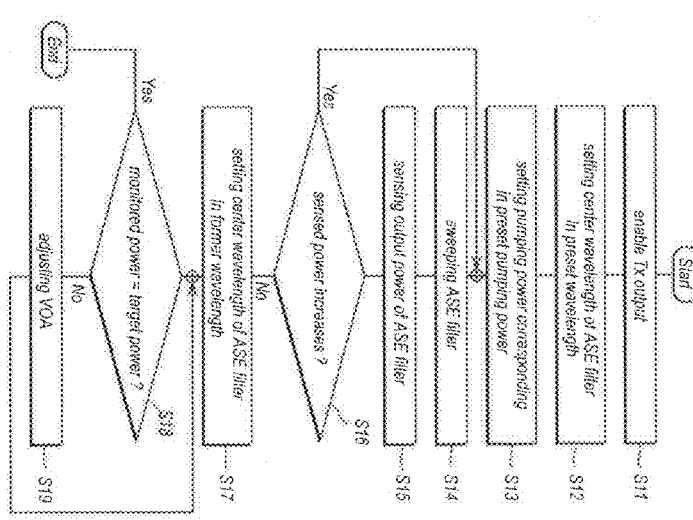
FIG. 6 is a flow chart for controlling the fiber amplifier shown in FIG. 5 in an initializing routine.

FIG. 6 shows a flow chart for controlling the ASE filter 69 and the VOA 68 in an initializing routine. Step S11 practically provides an optical signal having an optical wavelength to the fiber amplifier 60A, where the optical signal is output from the t-LD 20 in the optical transceiver 1. Step S12 sets the tunable wavelength passing band of the ASE Filter 69 in a preset wavelength. As described later, the preset wavelength is preferable to be set in a shortest wavelength or a longest wavelength in a wavelength range used in the coherent WDM system, because the center wavelength will be swept in subsequent steps. Accordingly, the shortest or the longest wavelength for the preset wavelength may simplify this sweep. Next, step S13 sets the pumping power of the pumping source 62 in a preset power, which is optional and may be selected such that the EDF 61 shows a practical optical gain but does not show excess ASE noises. Then, the sweep of the tunable wavelength passing band of the ASE Filter 69 begins as sensing the output power of the ASE Filter 69 at steps S14 to S16. The sweep iterates until the sensed power begin to decrease. When the sensed power decreases at step S16, then, the tunable wavelength passing band of the ASE filter 69 may be determined at the wavelength set in previous one cycle at step S17.

Next, the process adjusts the output power of the fiber amplifier 60A in the target power. After setting the tunable wavelength passing band of the ASE filter 69 at step S17, the process compares the output power sensed by the mPD 66A with the target power. When the sensed power is less than the target power, which corresponds to "No" at step S18, the controller 100 adjusts the attenuation of the VOA 68 until the output power of the fiber amplifier 60A becomes the target power. The output power is still less than the target power even when the attenuation of the VOA 68 is set to be 0 dB, the controller 100 increases the pump power by an amount and restarts the initializing control from step S14, because the variation of the pump power affects the tunable wavelength passing band of the ASE Filter 69; but the sweep of the tunable wavelength passing band may be started from once determined wavelength.

Figure 7:
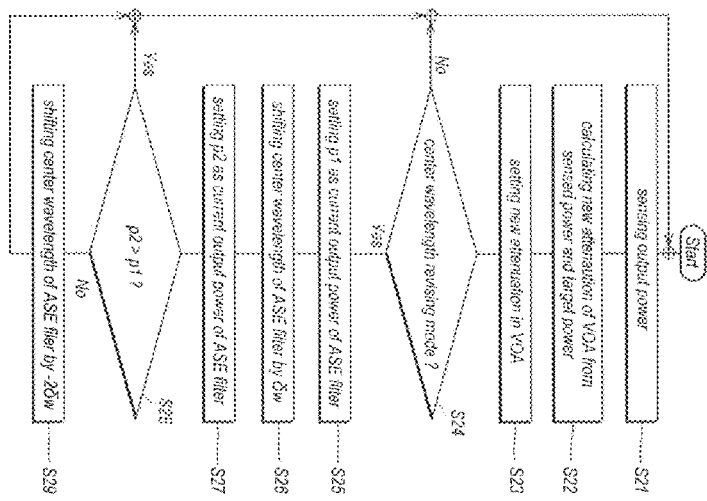
FIG. 7 is a flow chart for controlling the fiber amplifier shown in FIG. 5 in an ordinary routine.

FIG. 7 shows a flow chart for controlling the output power of the fiber amplifier 60A concurrently with the tunable wavelength passing band of the ASE Filter 69 during a stable state of the fiber amplifier 60A.

The fiber amplifier 60A first senses the output power by the mPD 66A at step S21. When the output power deviates from the target power, the controller sets new attenuation in the VOA 68 at steps, S22 and S23, which may be derived from a difference between the sensed power and the target power, and by referring to a look-up-table that co-relates the difference of the power to the attenuation. Subsequently, the controller 100 adjusts the tunable wavelength passing band of the ASE Filter 69 when the control mode is in the mode for adjusting the center wavelength. When the operation of the controller 100 is in the mode for correcting the output power, the control iterates the sense of the output power at step S21.

In the mode for adjusting the center wavelength, the controller 100 temporarily acquires the output power p1 of the ASE Filter 69 of the center wavelength currently set therein at step S25, shifts the center wavelength by δw at step S26, and senses the output power p2 of the ASE Filter 69 again at step S27. Comparing the former output power p1 with the latter output power p2 at step S28, the control procedure backs to the start when the latter output power p2 exceeds the former output power p1; that is, the current tunable wavelength passing band of the ASE Filter 69 becomes closer to the peak wavelength of the optical signal. On the other hand, when the latter output power p2 becomes less than the former output power p1, which means that the current tunable wavelength passing band of the ASE Filter 69 becomes apart from the peak wavelength of the optical signal, the controller 100 shifts the center wavelength by −2δw at step S29; that is, the controller 100 shifts the center wavelength by δw toward the direction opposite to the former direction, and the procedure of the control resumes step S21. Thus, the procedure shown in FIG. 7 concurrently matches the center wavelength with the peak wavelength of the optical signal and the output power in the target power. In the procedure thus described, two modes of the adjustment of the center wavelength and the correction of the output power are iterated; that is, the controller 100 stably or continuously iterates only the mode for correcting the output power; and intermittently performs the mode for adjusting the center wavelength.

The reason why the procedure sequentially carries the control of the output power and the adjustment of the center wavelength is that the tunable wavelength passing band of the ASE Filter 69 or the wavelength at which the output of the mPD 66B becomes maximum that deviates from the wavelength once set thereat depending on variation of the temperature and so on. Accordingly, the procedures carry out the correction of the output power after the tunable wavelength passing band of the ASE Filter 69 is shifted at steps, S26 and S29, regardless of the state of the ASE Filter 69 whether the tunable wavelength passing band thereof matches with the peak wavelength of the optical signal.

Figure 10:
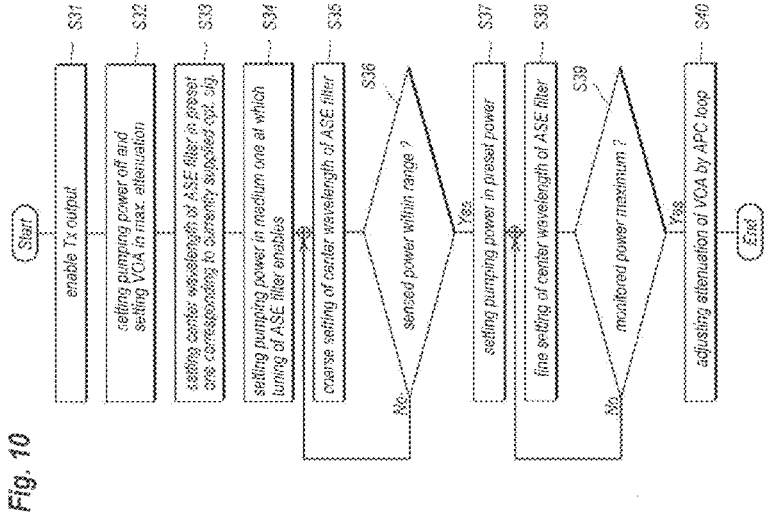
FIG. 10 is another flow chart for controlling the fiber amplifier modified from the algorithm shown in FIG. 6.

FIG. 10 shows another flow chart for controlling the output power of the fiber amplifier 60A at the tuned wavelength, modified from the algorithm shown in FIG. 6. In a practical use of the optical transceiver 1 in the WDM system, the aforementioned algorithm for tuning the output wavelength thereof outputs an optical signal with substantial power during the tuning of the ASE filter 69. That is, the flow chart shown in FIG. 6 first activates the pump source 62 then the ASE filter 69 is tuned in the tunable wavelength passing band thereof, which probably leaks the pump beam in the output port OUT of the fiber amplifier 60A even when the tunable wavelength passing band of the ASE filter 69 mismatches with the wavelength of the optical signal coming from the optical modulator 40, which should be avoided from a view point of increasing optical noises for other optical transceivers whose communication wavelengths match with the passing band of the ASE filter 69.

The modified flow chart shown in FIG. 10 may prevent the fiber amplifier 60A from leaking the optical signal during the tuning of the ASE filter 60, which is often called as the dark tuning. Specifically, when the fiber amplifier 60A receives a command to change the wavelength of the optical source 20 at step S31, namely, the wavelength of the optical signal output from the optical modulator 40, first sets the pumping power completely off and the attenuation of the VOA 68 in maximum to prevent the optical signal from being output from the fiber amplifier 60A, at step S32. Then, the algorithm sets the tunable wavelength passing band of the ASE filter 69 in a preset wavelength corresponding to the changed wavelength, or, in the shortest or the longest wavelength in a wavelength range used in the coherent WDM system, at step S33. Subsequently, the pumping power is set in a minimum power by which the tuning of the tunable wavelength passing band of the ASE filter 69 may be carried out, at step S34. Because the VOA 68 is set in the maximum attenuation, the pumping beam is unable to be output from the fiber amplifier 60A even the tunable wavelength passing band of the ASE filter 69 matches with the wavelength of the optical source 20.

Then, the algorithm begins the sweep of the tunable wavelength passing band of the ASE filter 69 as sensing the optical power output from the ASE filter 69 by the mPD 66B. When the sensed power is out of a preset range, the sweep of the tunable wavelength passing band of the ASE filter 69 continues. On the other hand, the sensed power of the mPD 66B becomes within in the present range, the coarse tuning of the tunable wavelength passing band of the ASE filter 69 at steps S35 and S36 is completed, and the algorithm advances the next step S37.

At step S37, the pumping power is set in a preset power, which is ordinary greater than the pumping power set in the coarse tuning but the fiber amplifier 60A still outputs substantially no optical signal because the VOA 68 in the attenuation thereof is set in maximum. The algorithm begins the fine tuning of the tunable wavelength passing band of the ASE filter 69 by the feedback loop of the mPD 66B, the controller 100, and the ASE filter 69 such that the sensed power by the mPD 66B becomes a maximum, at steps S38 and S39. Finally, the algorithm shown in FIG. 10 sets the output power of the fiber amplifier 60A by the APC loop of the mPD 66A, the controller 100, and the VOA 68. Details of the fine tuning above described are substantially same with the flow chart shown in FIG. 7.

Second Embodiment

Figure 8:
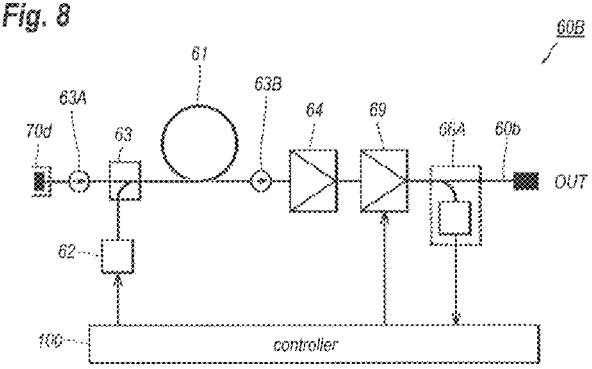
FIG. 8 shows a block diagram of a fiber amplifier according to the second embodiment of the present application.

FIG. 8 schematically shows a functional block diagram of another fiber amplifier 60B according to the second embodiment of the present invention. The fiber amplifier 60B shown in FIG. 8 removes the VOA 68 provided in the former fiber amplifier 60A. Instead, the fiber amplifier 60B adjusts the output power thereof by varying the pumping power of the pumping source 62. That is, the mPD 66A the controller 100, and the pumping source 62 constitute the first feedback loop for maintaining the output power in the target power, which is the APC loop; and the other feedback loop of the mPD 66, the controller 100, and the ASE filter 69 constitute the second one for adjusting the tunable wavelength passing band of the ASE filter 69. Because the fiber amplifier 60B removes the VOA 68, the fiber amplifier 60B may be formed in compact. As FIG. 1 shows the outer appearance of the optical transceiver 1 implementing the fiber amplifier therein, the optical transceiver 1 has an extremely restricted inner space. Accordingly, removal of electrical and/or optical components is strictly preferable. The fiber amplifier 60B shown in FIG. 8 without the VOA 68 is installed within the optical transceiver.

Figure 9A:
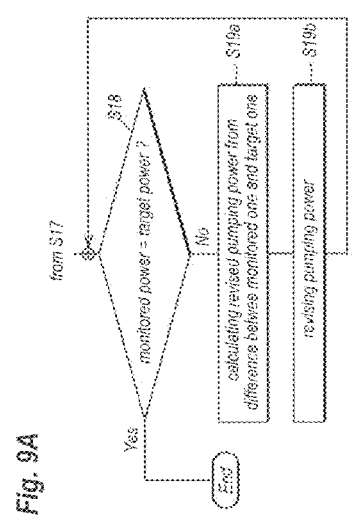
FIG. 9A is a flow chart for controlling the fiber amplifier shown in FIG. 8 in the initializing routine.
Figure 9B:
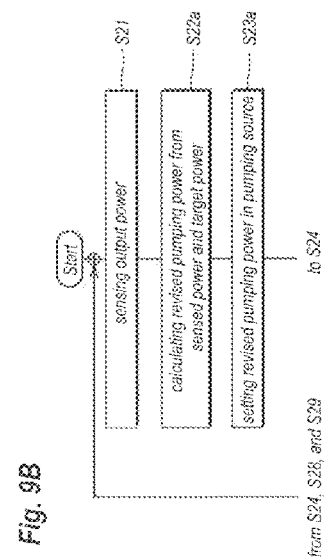
FIG. 9B is a flow chart for controlling the fiber amplifier shown in FIG. 8 in the ordinary routine.

Because the VOA 68 is removed from the fiber amplifier 60B, the correction of the output power is done by the modified procedures shown in FIGS. 6 and 7. FIGS. 9A and 9B show portions of the procedures for controlling the pumping source 62. In the initializing routine shown in FIG. 9A, the pumping power is once set in the preset amount for determining the tunable wavelength passing band of the ASE Filter 69 at steps S12 and S13. After aligning the tunable wavelength passing band of the ASE Filter 69 with the peak wavelength of the optical signal, the pumping power set in the pumping source 62 is adjusted such that the output power of the fiber amplifier 60B becomes the target power. That is, comparing the current output power of the fiber amplifier 60B with the target power at step S18, the controller 100 calculates revised pumping power next supplied to the pumping source 62 at step S19a when the current output power is different from the target power. Then, the controller 100 sets the revised pumping power in the pumping source 62 then carries out the procedure of step S18 for comparing two powers again. The steps, S18 to S19b, are iterated until the two powers become substantially equal to each other.

On the other hand, in an ordinary operation of the fiber amplifier 60B, the controller 100 first senses the current output power through the mPD 66A at step S21. Then, the controller 100 calculates a revised pumping power next supplied to the pumping source 62 from a difference between the sensed output power and the target power at step S22a. The controller 100 may access a table that co-relates the difference of the two powers with the pumping power, and sets the revised pumping power in the pumping source 62. Other procedures under the ordinary operation are same with those shown in FIG. 7. Thus, the arrangement shown in FIG. 8 may show the function same with that realized in the arrangement shown in FIG. 5 even the arrangement shown in FIG. 8 removes the VOA 63.

Moreover, the arrangement of FIG. 8 may further remove the PD 62a that senses the output of the pumping source 62. The pumping source 62 in the fiber amplifier 60B is ordinarily controlled based on the output of the fiber amplifier 60B not the PD 62a; accordingly, the fiber amplifier 60B may omit the PD 62a. In a case where the control through the mPD 66A takes a time because the control includes the adjustment of the tunable wavelength passing band of the ASE Filter 69, the PD 62a may be effective to realize a local APC loop for the pumping source 62.

Modification of Second Embodiment

Figure 11:
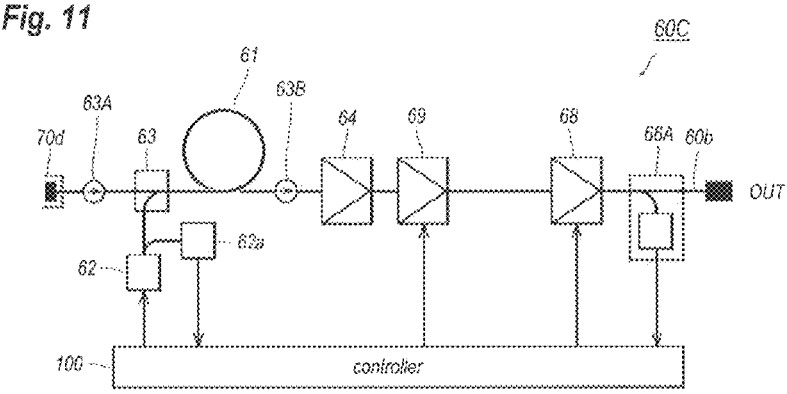
FIG. 11 shows a block diagram of a fiber amplifier according to a modification of the second embodiment shown in FIG. 8.

FIG. 11 schematically illustrates an arrangement of a fiber amplifier 60C which is modified from the arrangement of the fiber amplifier 60B of the second embodiment. The fiber amplifier 60C shown in FIG. 11 provides the VOA 68 downstream of the ASE filter 69 for enabling the tuning. The tuning of the fiber amplifier 60C shown in FIG. 11 becomes complex compared with that carried out in the fiber amplifier 60A shown in FIG. 5 because the fiber amplifier 60C of the present embodiment omits the mPD 66B that may sense the optical output directly from the ASE filter 69. The tuning of the center wavelength of the ASE filter 69, as described above, may be carried out by the feedback loop of the mPD 66A, the controller 100, and the ASE filter 69.

Accordingly, the tuning of the fiber amplifier 60C when the optical transceiver 1 changes the wavelength of the optical source 20 is carried out by setting the pumping power in the minimum power during the procedures of the tuning. Referring to the flow chart shown in FIG. 10, the pumping power in the coarse tuning is set in the minimum power at which the tuning of the tunable wavelength passing band of the ASE filter 69 is enabled. That is, the minimum pumping power is the minimum power only enabling the tuning of the center wavelength. However, the fiber amplifier 60A of the first embodiment increases the pumping power to the preset power, which is greater than the minimum power, during the fine tuning because the fiber amplifier 60A provides the VOA 68 the ASE filter 69 and this VOA 68 effectively and enough attenuates the output of the ASE filter 69.

The fiber amplifier 60C of the present embodiment, because of no mPD 66B, keeps the pumping power in the minimum power during the fine tuning. After the fine tuning, the output power of the fiber amplifier 60C is controlled by the APC loop of the mPD 66A, the controller 100, and the pumping source 62. It is preferable that the fine tuning of the center wavelength is carried out after the APC control because the APC control possibly varies the center wavelength of the optical signal just output from the EDF 61.

The algorithm to tune the center wavelength in the fiber amplifier 60C will be further described. First, turning off the pumping source 62 and setting the VOA 68 in the maximum attenuation, the ASE filer 69 is driven by preset conditions. For instance, the ASE filer 69 of a type of etalon filter, heaters implemented therein are provided with predetermined power corresponding to the wavelength to be output from the fiber amplifier 60C. Concurrently with the initialization of the ASE filter 69, the t-LD 20 is conditioned so as to emit light with this wavelength.

After the t-LD 20 stabilizes the emission thereof, in particular, the wavelength thereof, and the ASE filter 69 is also stably operated so as to pass the wavelength of the t-LD 20, the pumping source 62 is practically activated by providing a preset bias, which may be determined based on the output power of the fiber amplifier 60C of +5 dBm at the attenuation in the VOA 68 to be 20 dB. Here, the attenuation of the VOA 68 has a value equal to or greater than zero, and a larger value of the attenuation causes a smaller value of power of light output from the VOA 68. Namely, the VOA 68 with the attenuation of 20 dB, for example, will cause output light with power of −20 dBm from input light with power of 0 dBm. Setting the loop gain of the feedback loop of the VOA 68, mPD 66A, and the controller 100 in a maximum, the ASE filter 69 in the pass band thereof may be finely adjusted by sweeping the pass band and sensing the output of the fiber amplifier 60C by the mPD 66A.

After the ASE filter 69 is finely adjusted in the pass band thereof to the wavelength corresponding to the emission wavelength of the t-LD 20, the closed loop gain of the feedback loop is set in the ordinary gain, namely, decreasing the closed loop gain, and the output power of the fiber amplifier 60C may be adjusted in the predetermined value by the closed loop of the VOA 68, the mPD 66A, and the controller 100. Thus, the optical output of the fiber amplifier 60C may be adjusted in both of the wavelength and the power thereof.

Figure 13:
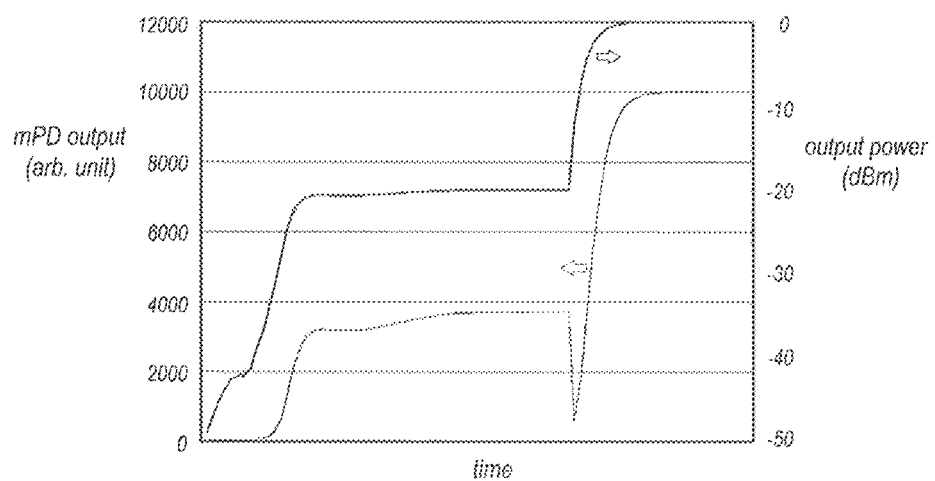
FIG. 13 shows a typical behaviors of the output power of the fiber amplifier of the modified arrangement of the second embodiment shown in FIG. 11 and the output of the monitor photodiode during the initializing routine for setting the center of the passing band of the ASE filter and the output power of the fiber amplifier.

FIG. 13 shows the optical output of the fiber amplifier 60C in the right axis and the output of the mPD 66A in the left axis during the initialization of the fiber amplifier 60C. During the coarse tuning of the ASE filter 69, the output power of the VOA 68 is kept around −20 dBm under the maximum closed loop gain for setting the wavelength tunable passing band of the ASE filter 69. After the coarse turning, the closed loop gain of the APC loop formed by the mPD 66A, the controller 100, and the VOA 68 is once set in a practical gain that appears a dip in the beginning of the APC loop. Finally, under the practical closed loop gain, the output power of the fiber amplifier 60C is adjusted in a preset power, which is 0 dBm in the embodiment shown in FIG. 13.

Third Embodiment

Figure 12:
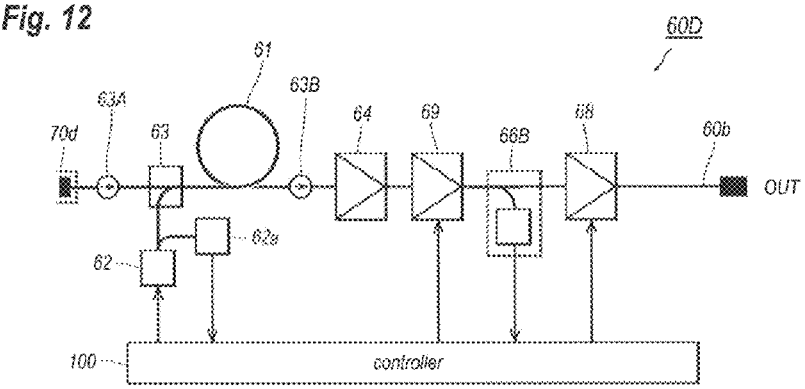
FIG. 12 shows a block diagram of a fiber amplifier according to the third embodiment of the present application.

FIG. 12 schematically illustrates still another arrangement of a fiber amplifier 60D according to the third embodiment of the present invention. The fiber amplifier 60D of the present embodiment, compared with those aforementioned embodiment, provides the mPD 66B set just downstream of the ASE filter 69 but omits the other mPD 66A set in downstream, or in the output of the VOA 68. Because the fiber amplifier 60D of the present embodiment provides the mPD 66B, the dark tuning of the tunable wavelength passing band of the ASE filter 69 may be carried out by the procedures shown in the flow chart of FIG. 10, but, the APC loop for setting the output power of the fiber amplifier 60D in the target power becomes hard because the fiber amplifier 60D has no mPD in the output thereof.

The fiber amplifier 60D, instead of the APC loop using an mPD, carries out the feedforward control for adjusting the output power. That is, the mPD 66B set in the output of the ASE filter 69 may sense the output power of the ASE filter 69, which is just the input optical power of the VOA 68. Accordingly, comparing the sensed output power of the ASE filter 68, the input power of the VOA 68, with the target power, the controller 100 may set the attenuation of the VOA 68 by referring to a table stored in the controller 100 or else, where the table co-relates the difference between the input and the output of the VOA 68 to the attenuation to be set in the VOA 68. Thus, the fiber amplifier 60D may keep the output power thereof in the target power.

While particular examples of the present invention have been described herein for purposes of illustration, many modifications and changes will become apparent to those skilled in the art. For instance, the fiber amplifier 60B shown in FIG. 8 may further provide attenuators with fixed attenuation between the EDF 61 and the GFF 64, between the GFF 64 and the ASE Filter 69, and in downstream of the mPD 66A, in addition to the GFF 64 and the ASE Filter 69. In order to enhance the OSNR (optical signal to noise ratio) of the optical signal output from the fiber amplifier 60B; a relatively larger current is preferably provided to the pumping source 62. An EDF is known to increase the OSNR as increasing the pumping current. In such a case, when the optical input signal output from the optical modulator 40 has substantial intensity, the output power of the EDF 61, that of the GFF 64, and that of the ASE Filter 69 sometimes exceed an allowable range. The attenuators with the fixed attenuation may substantially reduce the optical power in respective stages. The APC control by the mPD 66A, the controller 100, and the pumping source 62 may perform the fine adjustment of the output power of the fiber amplifier 60B. Accordingly, the appended claims are intended to encompass all such modifications and changes as fall within the true spirit and scope of this invention.

In the dark tuning, the VOA 68 is first set in the condition where substantially no power is output therefrom, then, the tuning of the ASE filter 69 is carried out so as to the output of the mPD.

What is claimed is:

1. A method of controlling an optical transceiver that implements a wavelength tunable optical source that emits light with a preset wavelength and a fiber amplifier that provides an erbium doped fiber, an amplified spontaneous emission (ASE) filter, a variable optical attenuator (VOA), a first monitor photodiode (mPD), and a second mPD, the first mPD sensing an output of the VOA, the second mPD sensing an output of the ASE filter, the ASE filter having a tunable wavelength passing band but filtering amplified spontaneous emission out of the tunable wavelength passing band, the method comprising steps of:
   tuning the tunable wavelength passing band of the ASE filter to the preset wavelength of the wavelength tunable optical source by sensing the output of the ASE filter with the second mPD;
   adjusting output power of the fiber amplifier to a preset power by sensing the output of the VOA with the first mPD; and
   iterating the steps of tuning the tunable wavelength passing band and adjusting the output power of the fiber amplifier so that the fiber amplifier emits light with the preset power at the preset wavelength.

2. The method of claim 1,
wherein the step of tuning the tunable wavelength passing band of the ASE filter includes steps of:
sensing the output of the ASE filter by the second mPD, and
tuning the tunable wavelength passing band of the ASE filter such that the output of the ASE filter sensed by the second mPD becomes a maximum.

3. The method of claim 2,
wherein the ASE filter is a type of etalon filter, and
wherein the step of tuning the tunable wavelength passing band of the ASE filter includes a step of adjusting a temperature of the etalon filter.

4. The method of claim 2,
wherein the ASE filter is a type of Mach-Zehnder modulator, and
wherein the step of tuning the tunable wavelength passing band of the ASE filter includes a step of biasing the Mach-Zehnder modulator.

5. The method of claim 1,
wherein the step of adjusting the output power of the fiber amplifier includes steps of:
sensing the output of the VOA, and
adjusting an attenuation of the VOA such that the first mPD outputs a preset magnitude that corresponds to the preset power of the fiber amplifier.

6. The method of claim 1,
wherein the fiber amplifier further includes a controller, and
wherein the step of tuning the tunable wavelength passing band of the ASE filter is carried out by a closed feedback loop formed by the second mPD, the controller, and the ASE filter, and
wherein the step of adjusting the output power of the fiber amplifier is carried out by another closed feedback loop formed by the first mPD, the controller, and the VOA.

7. The method of claim 1,
further includes a step of, before the step of tuning the tunable wavelength passing band of the ASE filter, tuning the wavelength tunable optical source so as to provide light with the preset wavelength to the fiber amplifier.

8. The method of claim 1,
wherein the step of tuning the tunable wavelength passing band of the ASE filter includes a step of setting an attenuation of the VOA to a maximum.

9. An optical transceiver that communicates with a host system, comprising:
   a wavelength tunable optical source that emits light with a preset wavelength set by a command provided from the host system; and
   a fiber amplifier that includes,
   an erbium doped fiber (EDF);
   a pumping source that provides a pump beam to the EDF by which the EDF amplifies the light provided from the wavelength tunable optical source;
   an amplified spontaneous emission (ASE) filter implemented downstream of the EDF, the ASE filter having a tunable wavelength band that passes the light amplified by the EDF but filters out amplified spontaneous emissions that are generated by the EDF and have wavelengths out of the tunable wavelength band; and
   a variable optical attenuator (VOA) implemented downstream of the ASE filter, the VOA setting output power of the fiber amplifier to preset power by attenuating the amplified light received from the EDF through the ASE filter.

10. The optical transceiver of claim 9,
further includes a controller and a monitor photodiode (mPD) that senses an output of the VOA,
wherein the mPD, the controller, and the VOA constitute a feedback loop that adjusts the power of the fiber amplifier to the preset power.

11. The optical transceiver of claim 9,
further includes a controller and a mPD that senses light output from the ASE filter,
wherein the mPD, the controller, and the ASE filter constitute a feedback loop that tunes the tunable wavelength band of the ASE filter to the preset wavelength of the wavelength tunable optical source.

12. The optical transceiver of claim 9,
further includes a controller and a mPD that senses an output of the ASE filter through the VOA, wherein the mPD, the controller, and the ASE constitute a feedback loop that tunes the wavelength band of the ASE filter to the preset wavelength of the wavelength tunable optical source, and wherein the third mPD, the controller, and the VOA constitute another feedback loop that adjusts the power of the fiber amplifier to the preset power.

13. An optical transceiver that communicates with a host system, comprising:
 a wavelength tunable optical source that emits light with a preset wavelength set by a command provided from the host system; and
 a fiber amplifier that includes,
 an erbium doped fiber (EDF);
 a pumping source that provides a pump beam to the EDF by which the EDF amplifies the light provided from the wavelength tunable optical source;
 an amplified spontaneous emission (ASE) filter implemented downstream of the EDF, the ASE filter having a tunable wavelength passing band that passes the light amplified by the EDF but filters out amplified spontaneous emissions generated by the EDF having wavelengths out of the tunable wavelength passing band;
 a monitor photodiode (mPD) that senses an output of the fiber amplifier; and
 a controller,
 wherein the mPD, the pumping source, and the controller form a feedback loop that adjusts the output of the fiber amplifier to preset power, and the mPD, the ASE filter, and the controller form another feedback loop that tunes the tunable wavelength passing band of the ASE filter to the preset wavelength of the wavelength tunable optical source.

* * * * *